US010532493B2

(12) United States Patent
Fabre et al.

(10) Patent No.: US 10,532,493 B2
(45) Date of Patent: *Jan. 14, 2020

(54) INSTALLATION AND A METHOD FOR FORMING A FIBER PREFORM AS A BODY OF REVOLUTION PRESENTING A PROFILE THAT VARIES IN RADIAL SECTION

(71) Applicant: SAFRAN AIRCRAFT ENGINES, Paris (FR)

(72) Inventors: Hubert Jean Marie Fabre, Moissy-Cramayel (FR); Nicolas Ashtari, Moissy-Cramayel (FR); Jérémy Hellot, Moissy-Cramayel (FR); Marc-Emmanuel Techer, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/081,356

(22) PCT Filed: Mar. 2, 2017

(86) PCT No.: PCT/FR2017/050469
§ 371 (c)(1),
(2) Date: Aug. 30, 2018

(87) PCT Pub. No.: WO2017/149251
PCT Pub. Date: Sep. 8, 2017

(65) Prior Publication Data
US 2019/0061202 A1    Feb. 28, 2019

(30) Foreign Application Priority Data

Mar. 2, 2016  (FR) ..................... 16 51748

(51) Int. Cl.
*B29B 11/16*  (2006.01)
*B29C 70/32*  (2006.01)
(Continued)

(52) U.S. Cl.
CPC ............ *B29B 11/16* (2013.01); *B29C 53/562* (2013.01); *B29C 53/821* (2013.01); *B29C 70/32* (2013.01); *B29C 2053/8025* (2013.01)

(58) Field of Classification Search
CPC ..... B29C 53/562; B29C 70/326; B29C 53/56; B32B 38/1825; B32B 38/1866;
(Continued)

(56) References Cited

U.S. PATENT DOCUMENTS 4,213,234 A    7/1980  Ware
4,448,628 A *  5/1984  Stott ..................... B29C 53/824
                                                      156/425
(Continued)

FOREIGN PATENT DOCUMENTS

EP    2 497 625 A1    9/2012
GB    2 486 230 A     6/2012
NL    7 704 199 A    10/1977

OTHER PUBLICATIONS

International Preliminary Report on Patentability and the Written Opinion of the International Searching Authority as issued in International Patent Application No. PCT/FR2017/050469, dated Sep. 4, 2018.
(Continued)

*Primary Examiner* — Matthew J Daniels
(74) *Attorney, Agent, or Firm* — Pillsbury Winthrop Shaw Pittman LLP

(57) ABSTRACT

An installation for shaping a fiber preform as a body of revolution presenting a profile that varies in radial section, the installation including a storage mandrel for storing a
(Continued)

fiber texture, follower rollers, and a mold in the form of a body of revolution on which the fiber texture is to be shaped by winding, the follower roller(s) being placed between the storage mandrel and the mold in the form of a body of revolution. The storage mandrel, each follower roller, and the mold present radii across their axial widths that vary to define outer surfaces having profiles in relief. A follower roller has sectors releasably fastened on the outer surface of the roller, each sector extending over a fraction of the circumference of the roller and over all or part of the axial width of the roller.

9 Claims, 6 Drawing Sheets

(51) Int. Cl.
  B29C 53/56 (2006.01)
  B29C 53/82 (2006.01)
  B29C 53/80 (2006.01)

(58) Field of Classification Search
  CPC .............. B32B 38/1875; B65H 23/025; B65H 23/0251; B65H 23/063; B65H 23/0253; B65H 23/0255
  See application file for complete search history.

(56) References Cited

U.S. PATENT DOCUMENTS

| 2005/0104441 | A1* | 5/2005 | Bertelson | B29C 70/345 |
| | | | | 301/64.703 |
| 2009/0294567 | A1 | 12/2009 | Witmer et al. | |
| 2013/0221568 | A1* | 8/2013 | Shindo | B29C 43/222 |
| | | | | 264/258 |
| 2014/0113088 | A1 | 4/2014 | Goering | |

OTHER PUBLICATIONS

International Search Report as issued in International Patent Application No. PCT/FR2017/050469, dated Jun. 14, 2017.

* cited by examiner

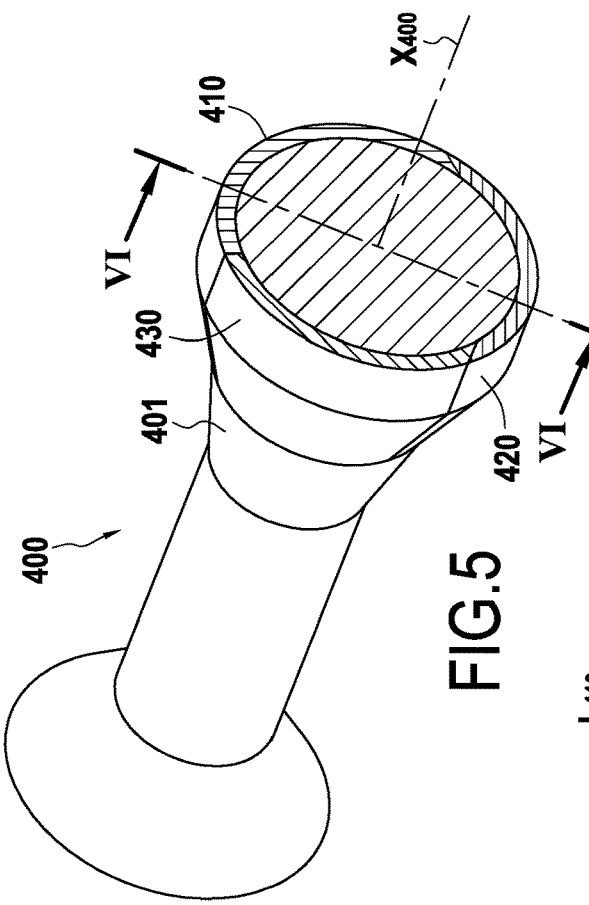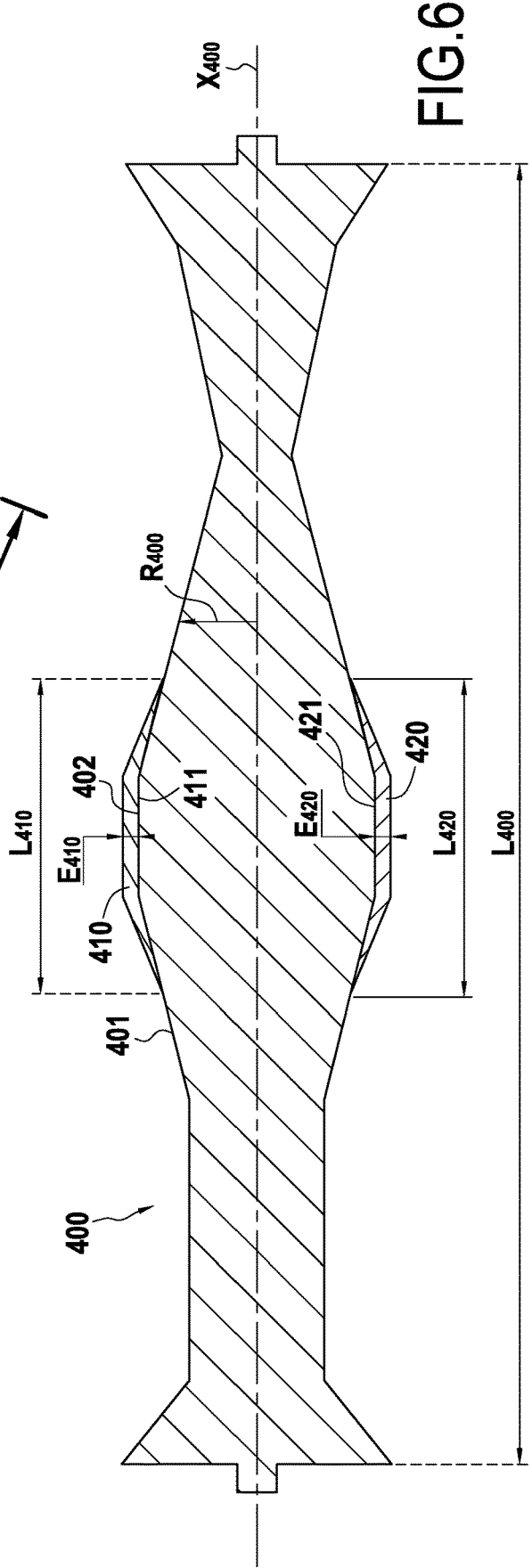

INSTALLATION AND A METHOD FOR FORMING A FIBER PREFORM AS A BODY OF REVOLUTION PRESENTING A PROFILE THAT VARIES IN RADIAL SECTION

CROSS REFERENCE TO RELATED APPLICATIONS

This application is the U.S. National Stage of PCT/FR2017/050469 filed Mar. 2, 2017, which in turn claims priority to French Application No. 1651748, filed Mar. 2, 2016. The contents of both applications are incorporated herein by reference in their entirety.

BACKGROUND OF THE INVENTION

The present invention relates to shaping a fiber preform by winding a fiber texture obtained by three-dimensional (3D) or multilayer weaving so as to constitute a fiber reinforcing structure for a composite material part.

More particularly, the invention relates to fiber preforms that are to form reinforcement in composite material parts that are bodies revolution of profile that varies in radial section (varying in shape and/or in thickness), such as for example an aeroengine fan casing.

The fiber preform in such a part is made by weaving a fiber texture and by winding the texture under tension onto a mold in the form of a body of revolution having a winding surface of radial section presenting a profile in relief corresponding to the profile of the part that is to be fabricated.

In order to make a fiber texture that matches the varying shape of the injection mold, use is made of shaped weaving, also known as "contour" weaving or "outline" weaving, which consists in taking off lengths of warp yarns that differ as a function of yarn position across the width of a fiber texture that is being being woven in the form of a strip so as to obtain ratios between the lengths of warp yarns (in the tangential direction) that are similar to the ratios between the radii defining the varying profile of the final part that is to be fabricated.

The fiber texture as woven in this way is stored on a storage mandrel for subsequently winding under tension onto an injection mold in the form of a body of revolution having a winding surface having a profile in relief in radial section that corresponds to the profile of the part that is to be fabricated. While it is being wound onto the mold, the texture is tensioned by the storage mandrel, also referred to as the "take-up" mandrel, with one or more follower rollers being placed between the storage mandrel and the injection mold. In the axial width direction, the or each follower roller presents a radius that varies, defining an outer surface with a profile in relief that serves to conserve the yarn length ratios as defined during the weaving between the storage mandrel and the injection mandrel.

Nevertheless, while the fiber preform is being formed on the mold, the fiber texture is wound onto itself in a plurality of turns. On each winding turn, the ratio between the various radii defining the profile in relief changes as a function of the number of fiber texture turns that have already been wound. The magnitudes of these changes in profile increase with increasing shape and/or thickness ratios in the final part. However, the above-described shaping method allows the fiber texture to be driven under tension with only one profile in relief, i.e. with radii presenting a cross-section ratio that is constant.

While being wound onto the injection mold, the fiber texture comes out of register because of the differences between the profile as woven and the real profile onto which the texture is being wound, thereby giving rise to losses of tension in certain axial positions in the texture. Such unbalances in tension across the width of the part can give rise to numerous defects such as waves, fibers buckling, pinched fibers, zones of unwanted extra thickness, and fiber volume contents that are out of specification. Such unbalances in tension also make the shaping of the fiber texture by winding more complicated, in particular by giving rise to the formation of creases or misalignments, thereby making the shaping of the fiber texture more arduous and time-consuming.

OBJECT AND SUMMARY OF THE INVENTION

It is therefore desirable to be able to make 3D or multilayer fiber preforms with a profile in relief that varies during winding of the texture in such a manner as to avoid losses or unbalances of tension in the fiber preform.

For this purpose, the invention proposes an installation for shaping a fiber preform as a body of revolution presenting a profile that varies in radial section, the installation comprising a storage mandrel for storing a fiber texture in the form of a wound strip, one or more follower rollers, and a mold in the form of a body of revolution on which the fiber texture is to be shaped by winding, the follower roller(s) being placed between the storage mandrel and the mold in the form of a body of revolution, the storage mandrel, each follower roller, and the mold presenting radii across their axial widths that vary so as to define outer surfaces having profiles in relief; the installation being characterized in that at least one follower roller includes a plurality of sectors releasably fastened on the outer surface of said follower roller, each sector extending over a fraction of the circumference of the follower roller and over all or part of the axial width of the follower roller, each sector also presenting at least one thickness that is determined in such a manner as to modify locally the thickness of the profile in relief of the outer surface of the follower roller.

By using sectors that enable the thickness of the profile in relief of the outer surface of one or more follower rollers to be modified locally while winding the fiber texture under tension on the mold, the installation of the invention makes it possible to shape fiber preforms presenting profiles that vary in radial section and in which losses or nonuniformities of tension are significantly reduced. Furthermore, the sectors of the invention can also be used for locally increasing tension in the fiber texture, e.g. in order to reduce expansion of the preform in a thicker zone (in order to avoid pinching and buckling).

These effects can be seen while winding the texture onto the mold in order to shape it. Specifically, while being wound on the mold, the fiber preform presents few defects (waves, fiber buckling and/or pinching, zones of unwanted extra thickness, fiber volume contents that are out of specification, creases, misalignments, etc.) compared with a fiber preform made in accordance with the prior art, where tension unbalances are greater. This reduces the unwanted stops of the winding machine that are usually necessary for correcting defects such as creases or collapses of portions of the texture, which also require the machine to be reversed and action to be taken by one or more technicians.

According to a first particular characteristic of the installation of the invention, each sector presents a thickness that varies in the axial direction. It is thus possible to conserve or to modify the variation in the radius of the follower roller.

According to a second particular characteristic of the installation of the invention, each sector presents an inner surface having a shape corresponding to the portion of the outer surface of profile in relief of the follower roller on which said sector is fastened. Under such circumstances, the increase in the tension on the portion of the fiber texture in contact with the sectors is adjusted.

According to a third particular characteristic of the installation of the invention, at least one sector of the plurality of sectors has an edge that is chamfered so as to avoid putting the preform into contact with a sharp edge at the edge of a first sector that has been added to the follower roller and so as to cause the take-up force on the yarns to increase progressively.

The invention also provides a method of shaping a fiber preform as a body of revolution presenting a profile that varies in radial section from a fiber structure obtained by three-dimensional or multilayer weaving between a plurality of layers of warp yarns interlinked by weft yarns, the fiber texture being shaped by being wound under tension onto a mold in the form of a body of revolution, the fiber texture being unwound from a storage mandrel, the fiber texture passing over one or more follower rollers placed between the storage mandrel and the mold in the form of a body of revolution, the storage mandrel, each follower roller, and the mold presenting radii across their axial widths that vary in such a manner as to define outer surfaces having profiles in relief; the method being characterized in that, during the winding of the fiber texture onto the mold, it comprises adding a plurality of sectors on the outer surface of at least one follower roller, each sector extending over a fraction of the circumference of the follower roller and over all or part of the axial width of said follower roller, each sector also presenting at least one thickness that is determined in such a manner as to modify locally the thickness of the profile in relief of the outer surface of the follower roller.

According to a first particular characteristic of the method of the invention, each sector extends over a fraction of the circumference of the follower roller, which fraction is determined as a function of the circumferential fraction of contact between the fiber texture and the outer surface of said take-up roller.

According to a second particular characteristic of the method of the invention, each sector presents a thickness that varies in the axial direction.

According to a third particular characteristic of the method of the invention, each sector presents an outer surface having a shape corresponding to the portion of the outer surface of profile in relief of the take-up roller on which said sector is fastened.

According to a fourth particular characteristic of the method of the invention, at least one sector of the plurality of sectors has an edge that is chamfered so as to avoid putting the preform into contact with a sharp edge at the edge of a first sector that has been added to the follower roller and so as to cause the take-up force on the yarns to increase progressively.

BRIEF DESCRIPTION OF THE DRAWINGS

Other characteristics and advantages of the invention appear from the following description of particular implementations of the invention, given as nonlimiting examples, and with reference to the accompanying drawings, in which:

FIG. 5 is a diagrammatic view of the follower roller in radial section on plane V of FIG. 3;

FIG. 6 is a diagrammatic view of the follower roller in axial section on plane VI of FIG. 5;

DETAILED DESCRIPTION OF EMBODIMENTS

Figure 2:
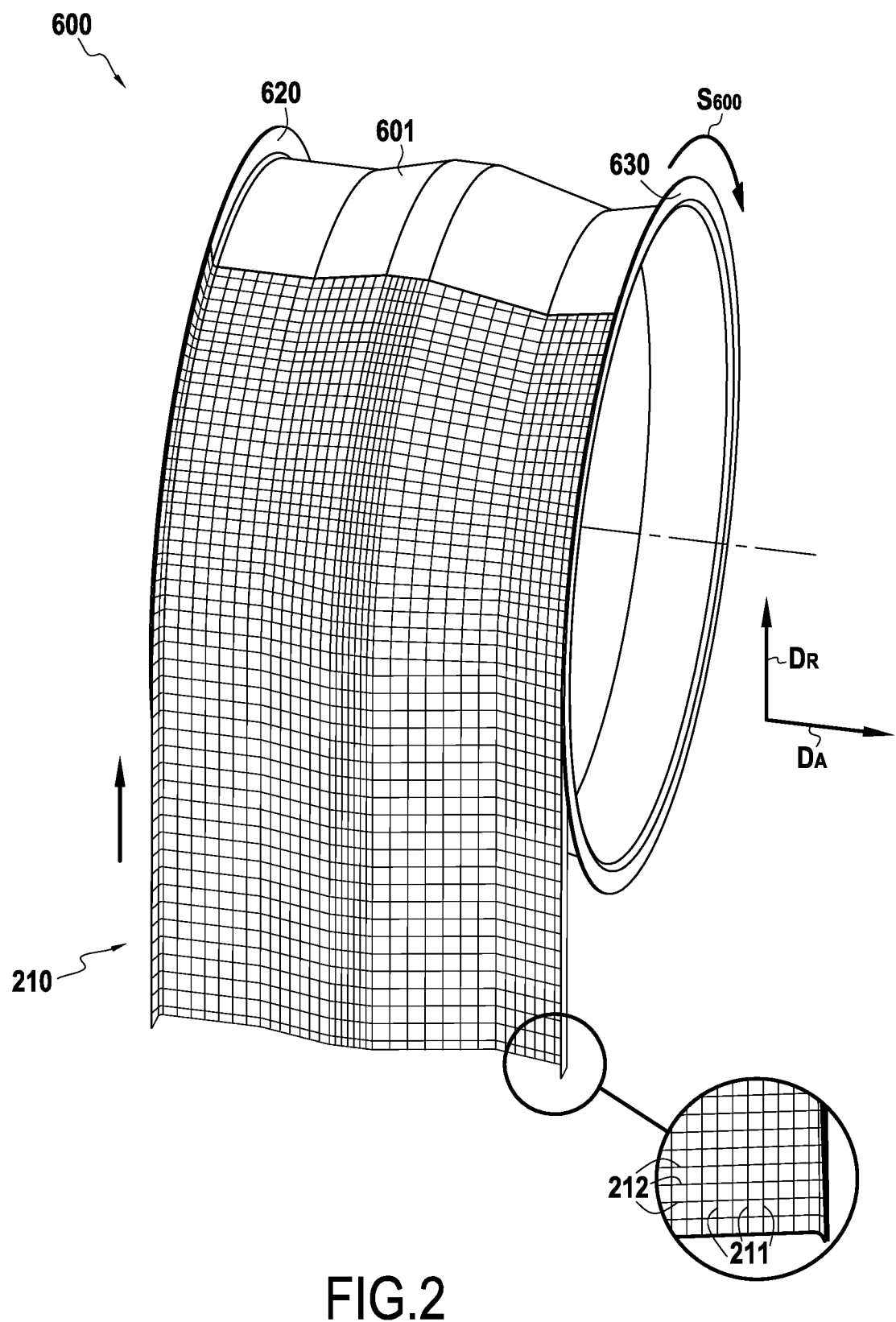
FIG. 2 is a diagrammatic perspective view showing a fiber texture being wound onto an injection mold of the FIG. 1 installation.

The invention applies in general manner to making a fiber preform as a body of revolution presenting a profile that varies in radial section and that is suitable for constituting the fiber reinforcement, or "preform", for fabricating a composite material part in the form of a body of revolution, likewise presenting a profile that varies and/or thickness that varies, in particular in radial section, where a radial section corresponds to a plane defined by the axial direction and by the radial direction of the mold on which the preform is shaped, such as the radial direction DA and the axial direction DR shown in FIG. 2. A part is obtained by winding a fiber texture onto a mold and by injecting a matrix precursor into the fiber preform made in this way, with the matrix typically being a resin.

Figure 1:
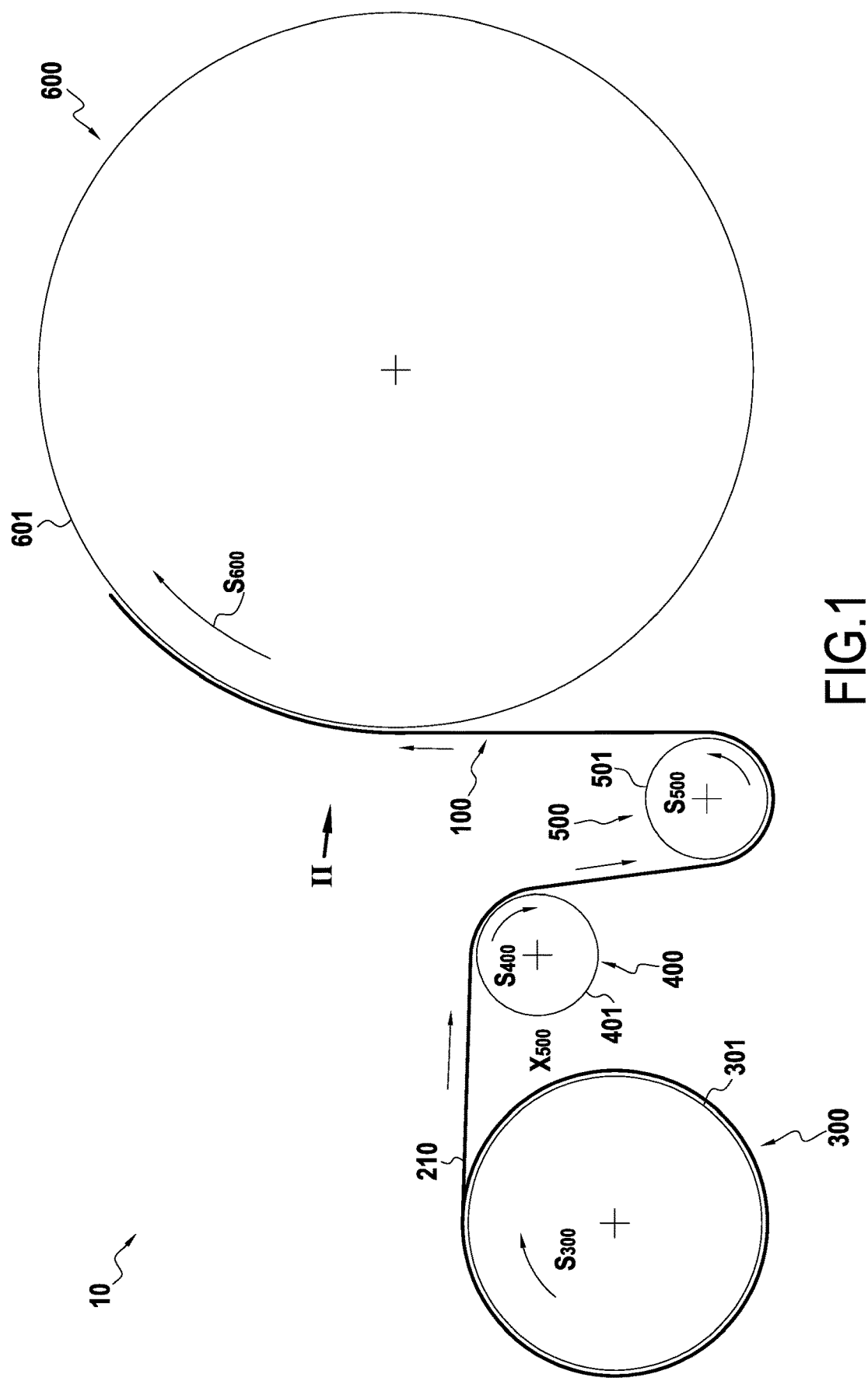
FIG. 1 is a diagrammatic view of an installation for shaping a fiber texture of varying shape in compliance with an implementation of the invention.

FIG. 1 shows an installation 10 for shaping a fiber preform to have a varying shape in accordance with an implementation of the invention. The installation 10 comprises a storage mandrel 300, two follower rollers 400 and 500 placed downstream from the mandrel 300 in the winding direction of the fiber texture, and a mold 600 arranged downstream from the follower roller 500. A fiber texture 210 present on the storage mandrel 300 is unwound therefrom in order to be shaped by being wound onto the mold 600, with winding taking place under tension that is controlled at the storage mandrel.

The fiber texture 210 is obtained by three-dimensional weaving or by multilayer weaving performed in known manner by means of a Jacquard type loom having a bundle of warp yarns or strands arranged thereon in a plurality of layers, with the warp yarns being interlinked by weft yarns.

The term "three-dimensional weaving" or "3D weaving" is used herein to mean a weaving technique in which at least some of the weft yarns interlink warp yarns over a plurality of warp layers, or vice versa. The 3D weaving may be of the interlock type, as described in Document WO 2006/136755.

The term "multilayer weaving" is used herein to mean 3D weaving with a plurality of warp layers in which the base weave for each layer is equivalent to a conventional 2D weave, such as a weave of plain, satin, or twill type, but including certain points of the weave that interlink the warp layers, or vice versa.

Making the fiber structure by 3D or multilayer weaving makes it possible to obtain linking between the layers, and thus to have good mechanical strength for the fiber structure and for the resulting composite material part, and to do so in a single textile operation.

In particular, the fiber structure may be woven using yarns of fibers made of, of ceramic such as silicon carbide, of glass, or indeed of aramid.

In order to make a fiber texture that is adapted to the varying shape of the fiber preform that is to be formed on the injection mold, use is made of a "contour" weaving technique, which consists in taking up different lengths of warp yarns depending on their positions across the width of the fiber texture that is woven in the form of a strip. For this purpose, use is made of one or more take-up rollers at the outlet from the loom that present across their axial width a radius that varies so as to define an outer surface having a profile in relief for taking up different lengths of warp yarn as a function of the positions of the yarns across the width of the fiber texture, a greater length of warp yarn being taken up by the portion(s) of a take-up roller of radius greater than the remainder of the roller. The differential take-up performed by the take-up rollers goes back to the weaving cell of the loom, causing the proper lengths of warp yarns to be pulled prior to inserting the next column of weft yarns. The texture as woven in this way is wound onto a storage mandrel or drum, also referred to as a "take-up" mandrel, situated downstream from the take-up rollers. The fiber texture is thus stored for subsequent shaping on a mold.

As shown in FIG. 2, the fiber preform is shaped by winding onto an injection mold 600 the fiber texture 210 made by three-dimensional weaving between a plurality of warp yarns 211 and a plurality of weft yarns 212, the fiber texture forming a strip presenting a profile that varies in cross-section, i.e. that varies in shape and/or in thickness in cross-section. In radial section, the mold presents a profile corresponding to the profile of the part that is to be made, which is an aeroengine fan casing in the presently-described example.

For this purpose, the mold 600 presents an outer surface 601 of profile in relief that corresponds to the inner surface of the casing that is to be made. By being wound onto the mandrel 200, the fiber texture 210 fits closely to the profile of the mandrel. The mold 600 also has two cheek-plates 620 and 630 for forming the portions of the fiber preform that correspond to the flanges of the casing that is to be fabricated. The mold 600 is driven in rotation in the direction of rotation $S_{600}$, e.g. by an electric motor (not shown in FIG. 2), while the fiber texture 210 is put under tension between the storage mandrel 300 and the mold 600 by the follower rollers 400 and 500.

The first and second follower rollers 400 and 500 placed downstream from the storage mandrel 300 are driven in respective directions of rotation $S_{400}$ and $S_{500}$ shown in FIG. 2. Across their axial width, they present respective radii that vary so as to define outer surfaces 401 and 501 having profiles in relief that corresponded to the profile intended for the fiber preform that is to be made.

The installation 10 also has a storage drum or mandrel 300, also referred to as a "take-up" mandrel, that is driven in rotation mainly in the direction of rotation $S_{300}$ and that likewise presents across its axial width a radius that varies so as to define an outer surface 301 having a profile in relief corresponding to the profile intended for the fiber preform in order to limit deformation of the fiber texture 210 while it is being stored. Since the storage mandrel 300 serves to tension the fiber texture while it is being wound, it can happen that its rotation is momentarily stopped or reversed relative to the direction of rotation $S_{300}$ in order to maintain tension in the texture while it is being wound on the injection mold.

Figure 3:
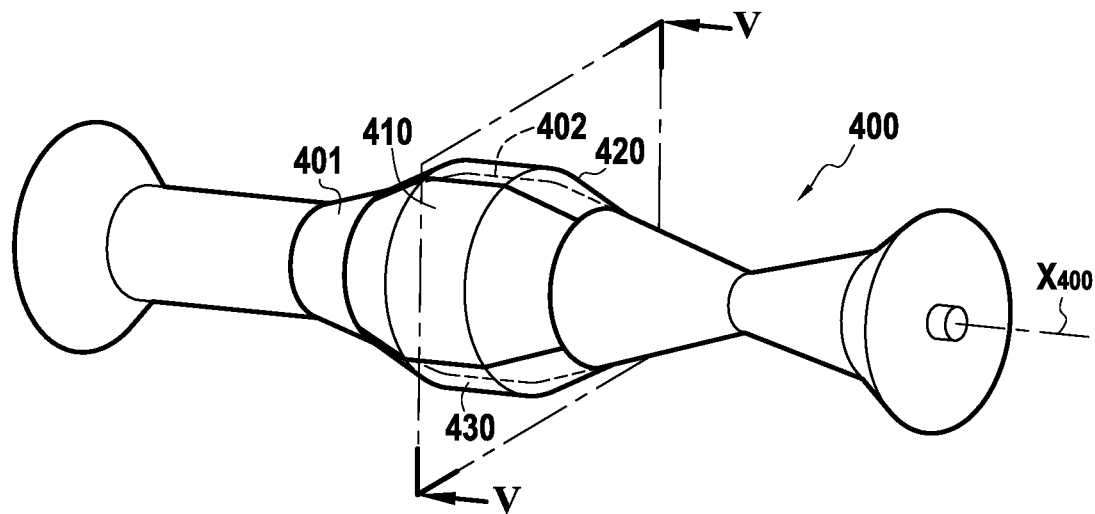
FIG. 3 is a diagrammatic perspective view of a follower roller of the FIG. 2 installation.
Figure 4:
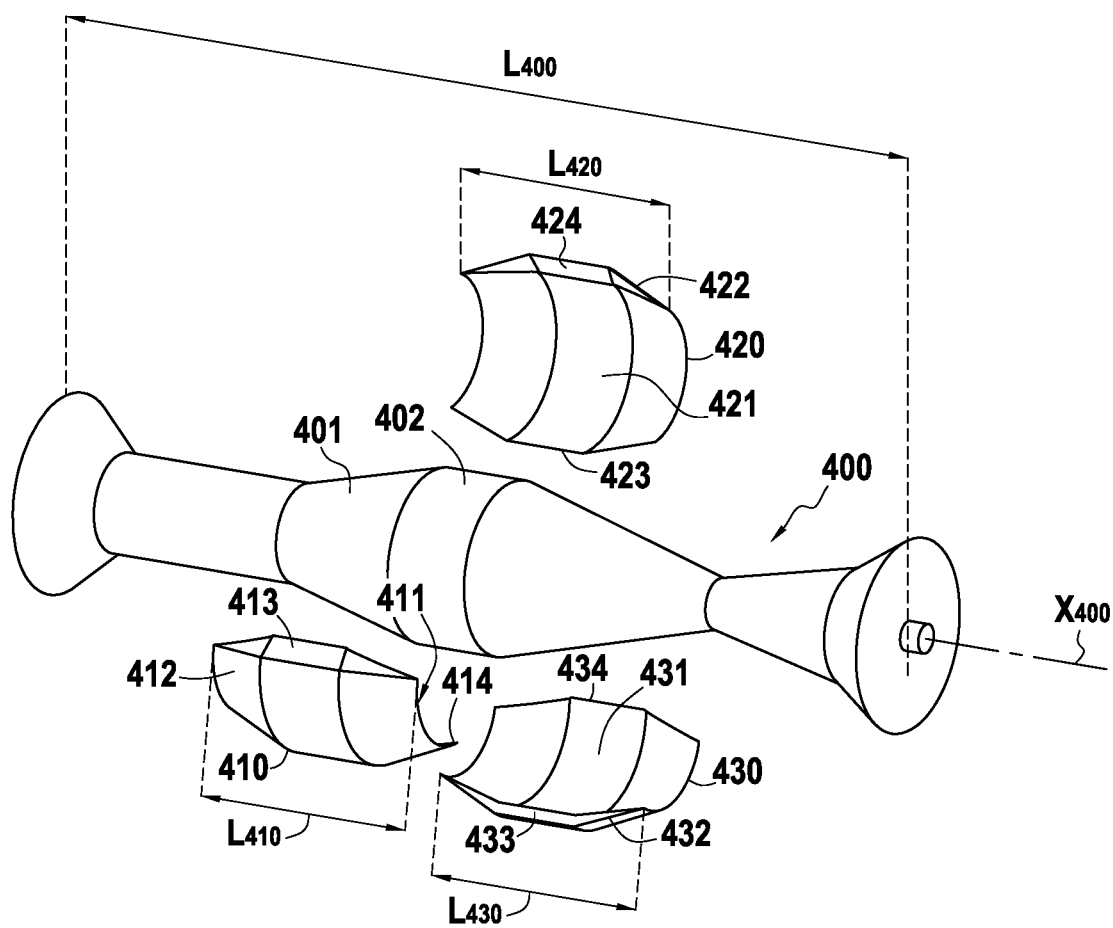
FIG. 4 is an exploded diagrammatic perspective view of the FIG. 3 follower roller.

In accordance with the invention, at least one follower roller is provided on its outer surface with a plurality of sectors that are removably attached, e.g. by means of nut-and-bolt type fastener members or by interfitting, each sector extending over a fraction of the circumference of the take-up roller and over all or part of the axial width of said take-up roller. In the presently described example and as shown in FIGS. 3 to 6, the follower roller 400 that extends axially along an axis $X_{400}$ and that has a radius $R_{400}$ that varies along the axis $X_{400}$ (FIG. 6), has three sectors 410, 420, and 430, as shown in FIGS. 3 and 4. Still in the presently-described example, the sectors 410, 420, and 430 present respective equivalent axial widths $L_{410}$, $L_{420}$, and $L_{430}$ that are less than the axial width $L_{400}$ of the follower roller 400, with axial widths being measured along the direction of the axis of the roller such as the axis $X_{400}$ for the follower roller 400. The sectors 410, 420, and 430 are for placing on a portion 402 of the follower roller 400, in which portion of the roller 400 the radius $R_{400}$ varies across the axial width $L_{400}$ so as to define a profile in relief in radial section (FIG. 6). For this purpose, the sectors 410, 420, and 430 have respective inner surfaces 411, 421, and 431 of shape corresponding to the portion 402 of the outer surface 401 of profile in relief of the follower roller 400 onto which the sectors are to be fastened, and respective outer surfaces 412, 422, and 432 of shapes that are determined as a function of the tension adjustment that it is desired to achieve in the portion of the fiber texture that is in contact with the sectors.

In this example, the sectors 410, 420, and 430 present respective thicknesses that vary across the axial widths $L_{410}$, $L_{420}$, and $L_{430}$ of the sectors 410, 420, and 430, as shown in FIG. 6 for the thicknesses $E_{410}$ and $E_{420}$ of the sectors 410 and 420. In the presently described example, the variation in the thicknesses of the sectors 410, 420, and 430 mainly follows the variation in the radius $R_{400}$, and consequently the shape of the profile in relief on the portion 402, so as to modify locally the thickness of the roller 400 while following the profile in relief of the outer surface of the follower roller in its portion 402. The sectors can also add extra thickness that is independent of the shape of the profile in relief of the roller.

Once fitted with the sectors 410, 420, and 430, the roller 400 applies greater tension to the fiber texture 210 in contact with the sectors.

Figure 7:
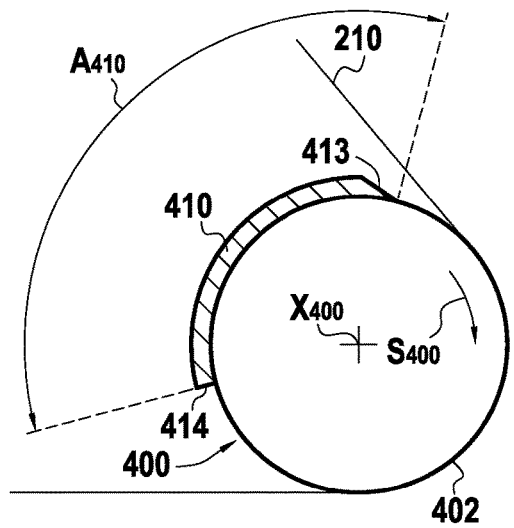
FIGS. 7 to 9 show a sequence of mounting sectors on a follower roller of the FIG. 2 installation.
Figure 8:
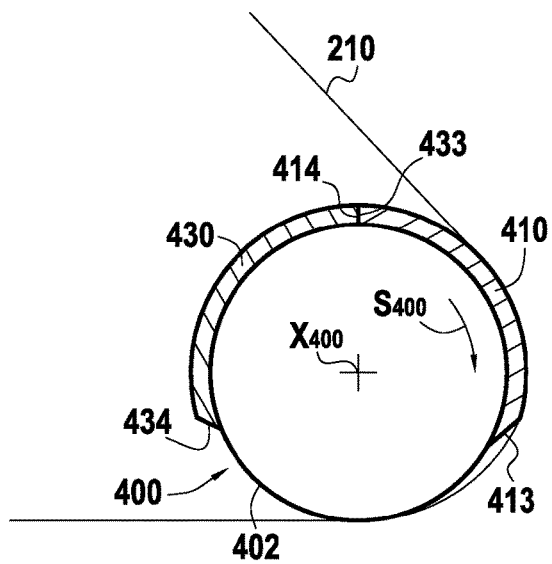
Figure 9:
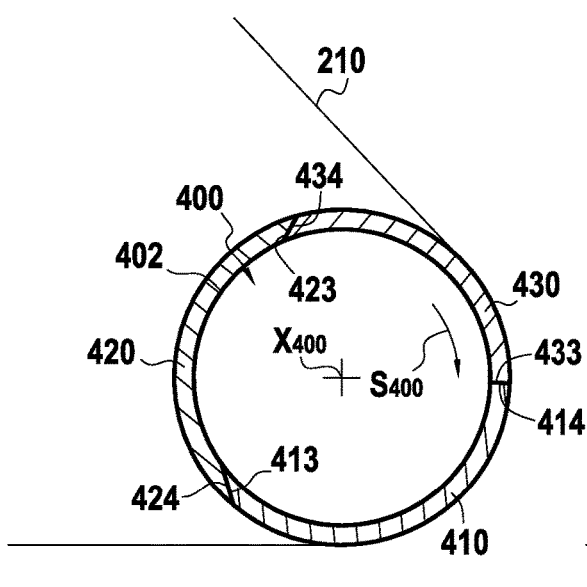
Figure 10:
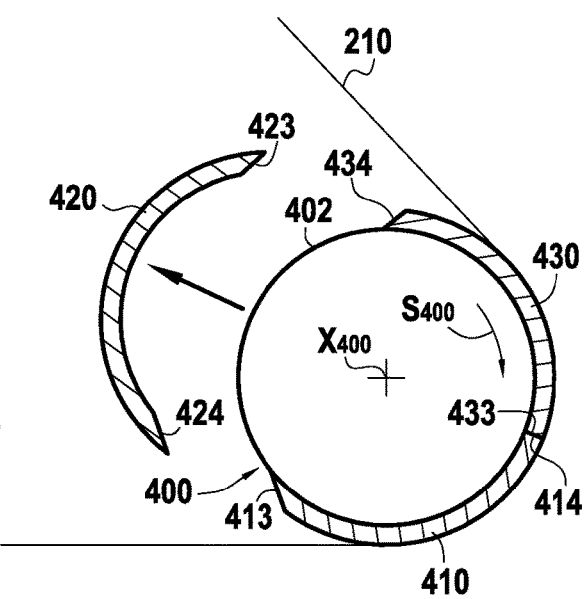
FIGS. 10 to 13 show a sequence of removing sectors from a follower roller of the FIG. 2 installation.

FIGS. 7 and 9 show how the sectors 410, 420, and 430 are mounted on the follower roller 400 while shaping the fiber texture 210. The sectors are fastened on the outer surface of the follower roller, e.g. by fastener members such as bolts that co-operate with tapping formed in the roller (not shown in figures). As shown in FIG. 7, a first sector, specifically the sector 410, is mounted on the fraction of the portion 402 of the roller 400 that is not in contact with the fiber texture 210. The sector 410, which is the first to come into contact with the texture 210, has a first edge 413 that is preferably chamfered towards the outer surface of the roller so as to avoid putting the preform into contact with a sharp edge at the edge of the sector, and so as to cause the take-up force on the warp yarns to be increased progressively. The take-up roller 400 then continues to be turned in the direction $S_{400}$ until a new fraction of the portion 402 of the take-up roller 400 is moved out of the zone of contact with the texture 210, thereby enabling the second sector 430 to be mounted (FIG. 8). The edge 433 of the sector 430 is placed against the edge 414 of the sector 410, which is partially in contact with the texture 210. The follower roller 400 continues to be turned in the direction $S_{400}$ until the last free fraction of the portion 402 of the roller 400 is disengaged from the zone of contact with the texture 210. The third sector 420 is then mounted on the roller 400 (FIG. 9). The edge 424 of the sector 420 is placed against the chamfered edge 413 of the sector 410, the edge 424 having a chamfered shape that is complementary to the shape of the edge 413. The edge 423 of the sector 420 is placed against the edge 434 of the sector 420.

While forming the fiber preform, the sectors 410, 420, and 430 are added when the tension exerted on the fiber texture needs to be modified, e.g. when the difference between the initial profile defined by the outer surface of the mold and the real profile onto which the texture is being wound is such that it can lead to losses of tension at certain axial positions in the texture.

Figures 11, 12:
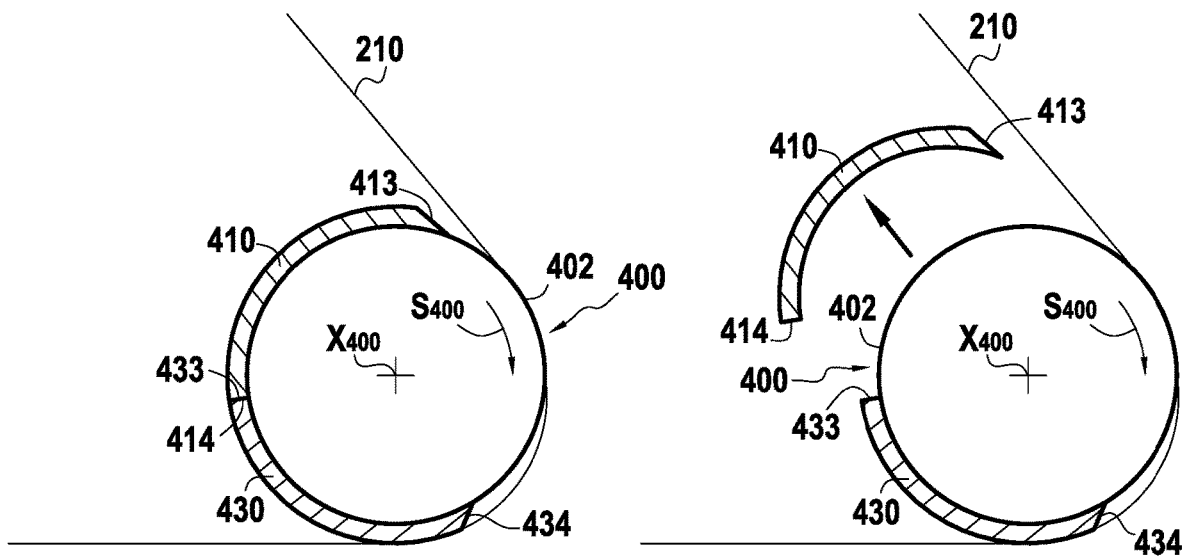
Figure 13:
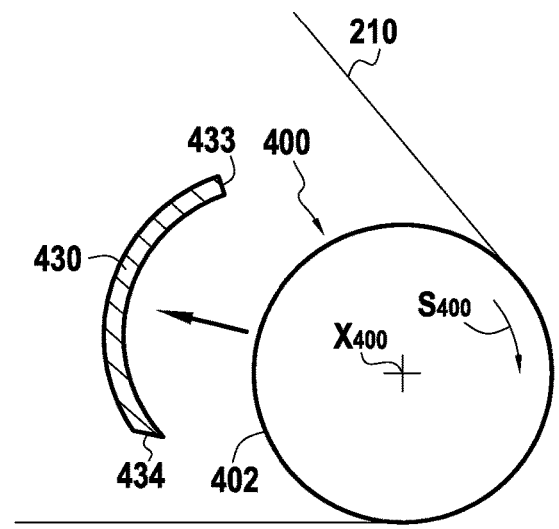

The sectors 410, 420, and 430 are removed in the same manner, as shown in FIGS. 10 to 13. During fabrication of the fiber texture 210, the first sector that is not in contact with the fiber texture is removed, i.e. in this example corresponding to the sector 420 in FIG. 10. Thereafter, the other two sectors 410 and 430 are removed one after the other, as shown in FIGS. 11 to 13 in such a manner as to reduce the thickness or the radius of the portion 402 of the follower roller 400. The sector 430, which is the last sector to be removed, has an edge 434 that preferably presents a chamfer oriented towards the outer surface of the roller so as to avoid putting the preform into contact with a sharp edge at the edge of the sector, the edge 423 of the sector 420 presenting a chamfered shape that is complementary to the shape of the edge 434.

Each sector extends over a fraction of the circumference of the roller. It presents a circularly arcuate length, such as the circularly arcuate length $A_{410}$ of the sector 410 shown in FIG. 7, which is defined as a function of the circularly arcuate length of the portion of the follower roller 400 that is not in contact with the fiber texture 210. Consequently, if the fiber texture is in contact with the follower roller over a relatively short circularly arcuate length, it is possible to use sectors having a relatively long circularly arcuate length, and vice versa. The number of sectors needed to cover the entire circumference of the follower roller is thus also determined as a function of the circularly arcuate length of the portion of the follower roller that is not in contact with the fiber texture.

Sectors may be used on a single follower roller, as described above for the roller 400, or on a plurality of follower rollers, such as the above-described rollers 400 and 500, so as to modify locally the thickness of the profile in relief of the outer surface of the take-up roller(s).

In the context of the invention it is also possible to mount a plurality of sectors on one another so as to increase or decrease progressively the thickness of the profile in relief of the outer surface of any follower roller.

The sectors are made of rigid material or of material that withstands compression well, such as metal or a plastics material. By way of example, the sectors may be made by molding, by machining, or by 3D printing.

By using sectors that enable the thickness of the profile in relief of the outer surface of one or more follower rollers to be modified locally while shaping a fiber preform, the installation and the method of the invention make it possible to shape fiber preforms as bodies of revolution presenting profiles that vary in a radial section and in which losses or nonuniformities of tension are significantly reduced. While being wound on the injection mold, the shaped fiber preform presents few defects (waves, fiber buckling and/or pinching, zones of unwanted extra thickness, fiber volume contents that are out of specification, creases, misalignments, etc.) compared with a preform shaped in accordance with the prior art, where tension unbalances are greater. This reduces the unwanted stops of the winding machine that are usually necessary for correcting defects such as creases or collapses of portions of the preform (e.g. its flanges), which also require the machine to be reversed and action to be taken by one or more technicians.

The invention claimed is:

1. An installation for shaping a fiber preform as a body of revolution presenting a profile that varies in radial section, the installation comprising a storage mandrel for storing a fiber texture in the form of a wound strip, one or more follower rollers, and a mold in the form of a body of revolution on which the fiber texture is to be shaped by winding, the follower roller(s) being placed between the storage mandrel and the mold in the form of a body of revolution, the storage mandrel, each follower roller, and the mold presenting radii across their axial widths that vary so as to define outer surfaces having profiles in relief; wherein at least one follower roller has a first profile presenting radii across its axial width that vary, said least one follower roller presenting a first radius over at least part of the axial width of the follower roller, said at least one follower roller including a plurality of sectors releasably fastened on the outer surface of said follower roller, each sector presenting at least one thickness and extending over a fraction of the circumference of the follower roller and over at least said part of the axial width of the follower roller so as to form, where the sector is fastened, a modified follower roller that has a second profile and a second radius that is greater than said first radius.

2. The installation according to claim 1, wherein each sector presents a thickness that varies in the axial direction.

3. The installation according to claim 2, wherein each sector presents an inner surface having a shape corresponding to the portion of the outer surface of profile in relief of the follower roller on which said sector is fastened.

4. The installation according to claim 1, wherein at least one sector of the plurality of sectors has an edge that is chamfered so as to avoid putting the preform into contact with a sharp edge at the edge of a sector that has been added to the take-up roller.

5. A method of shaping a fiber preform as a body of revolution presenting a profile that varies in radial section from a fiber structure obtained by three-dimensional or multilayer weaving between a plurality of layers of warp yarns interlinked by weft yarns, the fiber texture being shaped by being wound under tension onto a mold in the form of a body of revolution, the fiber texture being unwound from a storage mandrel, the fiber texture passing over one or more follower rollers placed between the storage mandrel and the mold in the form of a body of revolution, the storage mandrel, each follower roller, and the mold presenting radii across their axial widths that vary in such a manner as to define outer surfaces having profiles in relief; wherein, during the winding of the fiber texture onto the mold in the form of a body of revolution, the method comprises fastening a plurality of sectors on the outer surface of at least one follower roller, said at least one follower roller having a first profile presenting radii across its axial width that vary, said at least one follower roller presenting a first radius over at least part of the axial width of the follower roller, each sector presenting at least one thickness and extending over a fraction of the circumference of the follower roller and over at least said part of the axial width of said follower roller so as to form, where the sector is fastened, a modified follower roller that has a second profile and a second radius that is greater than said first radius.

6. The method according to claim 5, wherein each sector extends over a fraction of the circumference of the follower roller, which fraction is determined as a function of the circumferential fraction of contact between the fiber texture and the outer surface of said follower roller.

7. The method according to claim 5, wherein each sector presents a thickness that varies in the axial direction.

8. The method according to claim 5, wherein each sector presents an inner surface having a shape corresponding to the portion of the outer surface of profile in relief of the follower roller on which said sector is fastened.

9. The method according to claim 5, wherein at least one sector of the plurality of sectors has a chamfered edge.

* * * * *